US012568535B2

(12) United States Patent
Reimann

(10) Patent No.: US 12,568,535 B2
(45) Date of Patent: Mar. 3, 2026

(54) METHOD AND APPARATUS FOR GSM SILENT CALL PROLONGATION

(71) Applicant: Rohde & Schwarz GmbH & Co. KG, Munich (DE)

(72) Inventor: Joerg Reimann, Grosskarolinenfeld (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 332 days.

(21) Appl. No.: 18/360,876

(22) Filed: Jul. 28, 2023

(65) Prior Publication Data

US 2024/0098808 A1      Mar. 21, 2024

(30) Foreign Application Priority Data

Sep. 15, 2022    (EP) ..................................... 22195786

(51) Int. Cl.
| | | |
|---|---|---|
| *H04W 76/10* | (2018.01) | |
| *H04W 64/00* | (2009.01) | |
| *H04W 76/30* | (2018.01) | |

(52) U.S. Cl.
CPC ......... *H04W 76/10* (2018.02); *H04W 64/003* (2013.01); *H04W 76/30* (2018.02)

(58) Field of Classification Search
CPC ... H04W 76/10; H04W 64/003; H04W 76/30; H04W 76/25; H04W 4/02; H04W 64/00; H04M 3/2281; H04M 2242/30
See application file for complete search history.

(56) References Cited

U.S. PATENT DOCUMENTS

| | | | |
|---|---|---|---|
| 6,618,595 B1 | 9/2003 | Baumeister et al. | |
| 9,374,786 B1 | 6/2016 | Maheshwari et al. | |
| 2007/0022075 A1 | 1/2007 | Horvitz et al. | |
| 2015/0133140 A1* | 5/2015 | Garg ................... | H04W 56/001 |
| | | | 455/561 |
| 2015/0322463 A1 | 11/2015 | Marques et al. | |
| 2016/0242072 A1* | 8/2016 | Hsu ........................ | H04W 28/06 |
| 2018/0103418 A1* | 4/2018 | Aghili ..................... | H04W 4/00 |
| 2018/0332484 A1* | 11/2018 | Sundberg .............. | H04L 1/1685 |

(Continued)

FOREIGN PATENT DOCUMENTS

| | | |
|---|---|---|
| CN | 102123410 A | 7/2011 |
| DE | 298 15 173 U1 | 2/1999 |
| EP | 3 217 739 A1 | 9/2017 |

(Continued)

OTHER PUBLICATIONS

Extended European Search Report issued in EP 22195786.3-1213 by the European Patent Office on Feb. 10, 2023.

*Primary Examiner* — Abdullahi Ahmed
(74) *Attorney, Agent, or Firm* — Studebaker Brackett PLLC

(57) ABSTRACT

A method for GSM silent call prolongation comprises a first step of activating a mobile station by establishing a mobile terminated call, MTC, communication link to the mobile station. The establishing of the MTC communication link is performed without sending an assignment command message to the mobile station. The method comprises a second step of sending a first unrealizable SETUP message to establish the silent call. The method comprises a third step of sending at least one more unrealizable SETUP message to prolong the silent call.

14 Claims, 6 Drawing Sheets

100

101 — Activating a mobile station MS by establishing a mobile terminated call, MTC, communication link to the mobile station MS, wherein the establishing of the MTC communication link is performed without sending an assignment command message to the mobile station MS.

102 — Sending a first unrealizable SETUP message to establish a silent call.

103 — Sending at least one more unrealizable SETUP message to prolong the silent call.

(56) References Cited

U.S. PATENT DOCUMENTS

| | | | |
|---|---|---|---|
| 2019/0159077 A1* | 5/2019 | Ryu ........................ | H04W 8/04 |
| 2020/0304546 A1* | 9/2020 | Chavez .............. | H04L 65/1076 |

FOREIGN PATENT DOCUMENTS

| | | | |
|---|---|---|---|
| EP | 3217739 B1 * | 5/2019 | ........... H04W 60/04 |
| JP | H07-217164 A | 8/1995 | |
| RU | 2 363 106 C1 | 7/2009 | |
| WO | 2002/021780 A1 | 3/2002 | |
| WO | 2009/150268 A1 | 12/2009 | |

* cited by examiner

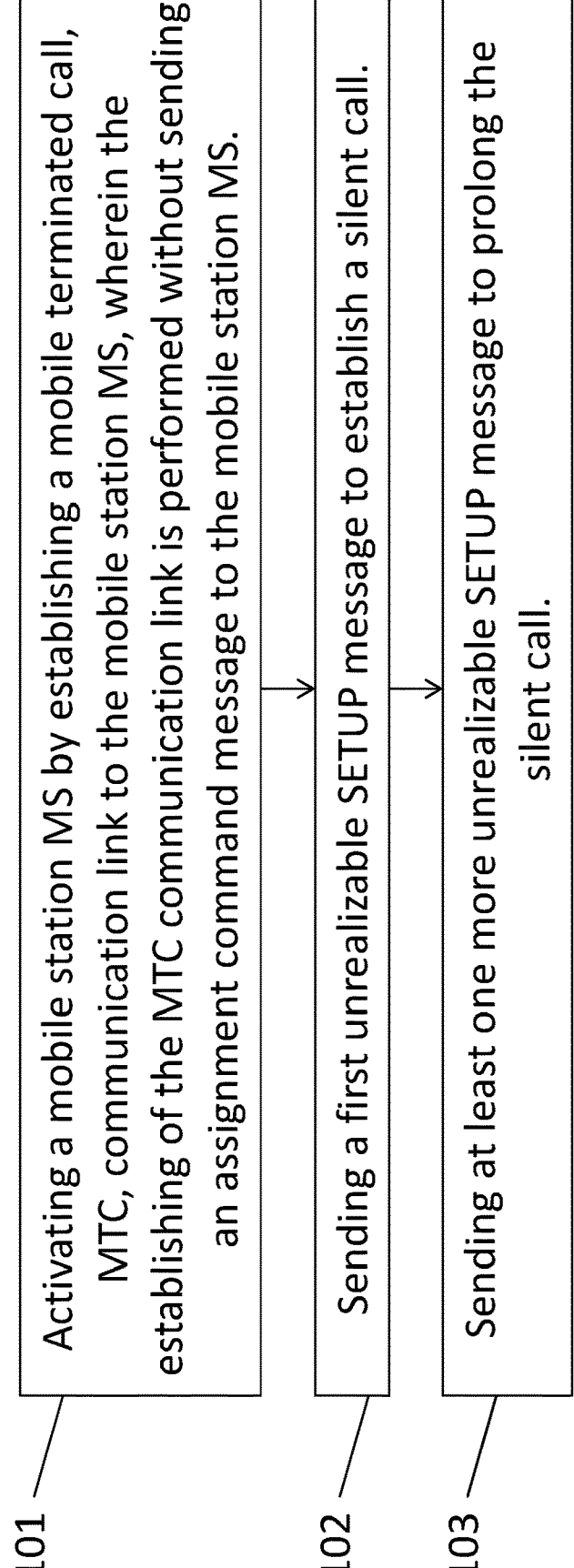

100

101 — Activating a mobile station MS by establishing a mobile terminated call, MTC, communication link to the mobile station MS, wherein the establishing of the MTC communication link is performed without sending an assignment command message to the mobile station MS.

102 — Sending a first unrealizable SETUP message to establish a silent call.

103 — Sending at least one more unrealizable SETUP message to prolong the silent call.

301 Activating a mobile station by performing a method according to FIG. 1 or FIG. 2.

302 Localizing the mobile station by using the established MTC communication link.

600
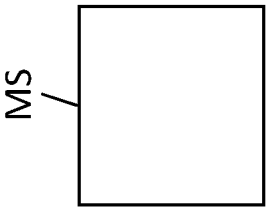
MS
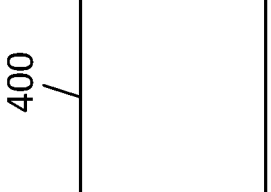
400
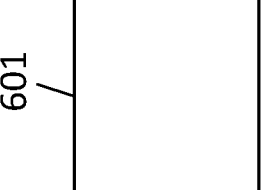
601
Fig. 6

METHOD AND APPARATUS FOR GSM SILENT CALL PROLONGATION

FIELD OF THE INVENTION

The present invention relates to a method for GSM silent call prolongation. The present invention further relates to a method for localizing the position of a mobile station. The present invention also relates to a mobile apparatus for performing said methods, as well as a vehicle and a system comprising such a mobile apparatus.

TECHNICAL BACKGROUND

In a cellular mobile network, there exists a public interest (e.g. for security applications) in determining, whether a particular mobile station is in the coverage area of a particular base station of the network. For these security applications, it is possible to set up a call (e.g. a GSM silent call) with a specific mobile station, which is not noticed by a user of the mobile station. This call can then be used for localization of the mobile station. However, recent mobile stations abort this call too early (e.g. after only 3 minutes), so that localization of the mobile station cannot be completed.

The current procedure for GSM silent call is no longer sufficient for newer mobile stations. In consequence a GSM direction finding is no longer guaranteed. Therefore, there is a need to prolong a GSM silent call and prevent it from being terminated too early.

SUMMARY OF THE INVENTION

Against this background, the object of the present invention is to provide an approach for prolonging a GSM silent call.

This object is solved by the features of the independent claims. The dependent claims contain further developments.

An inventive method for GSM silent call prolongation comprises the steps of: activating a mobile station by establishing a mobile terminated call, MTC, communication link to the mobile station, wherein the establishing of the MTC communication link is performed without sending an assignment command message to the mobile station; sending a first unrealizable SETUP message to establish the silent call; and sending at least one more unrealizable SETUP message to prolong the silent call.

This ensures that the GSM silent call is kept alive long enough to complete localization of the mobile station.

In particular, the activating of the mobile station is performed by a base transceiver station, BTS, and/or a base station controller, BSC.

In particular, the first unrealizable SETUP message is sent by a BTS and/or a BSC.

In particular, the at least one more unrealizable SETUP message is sent by a BTS and/or a BSC.

In other words, the at least one more unrealizable SETUP message is sent to keep the GSM silent call active.

Advantageously and preferably, the step of sending the at least one more unrealizable SETUP message is repeated after a predefined amount of time.

This ensures that the at least one more unrealizable SETUP message is sent again, before the silent call is terminated.

Advantageously and preferably, the step of sending at least one more unrealizable SETUP message is repeated after a predefined number of identity requests is sent.

This ensures that the time period for sending the at least one more unrealizable SETUP message again can be precisely made dependent on a number of identity requests.

In particular, the predefined number comprises at least 500 identity requests.

In particular, sending the unrealizable SETUP message every 500 identity requests corresponds to sending the unrealizable SETUP message about every 3 minutes.

In particular, sending the unrealizable SETUP message every 500 identity requests is early enough before the silent call is terminated due to not receiving the unrealizable SETUP message.

In particular, sending the unrealizable SETUP message every 500 identity requests prevents that the mobile station causes an error due to a too high number of identity requests received subsequently.

In particular, the identity requests are sent from a BTS and/or a BSC to the mobile station.

Advantageously and preferably, the step of sending the at least one more unrealizable SETUP message is repeated until a break condition is met.

This ensures that the silent call can be terminated upon request.

Advantageously and preferably, the first unrealizable SETUP message is for at least one of: making the mobile station answering with an error message; keeping the mobile station active; keeping the mobile station waiting in a call control level; keeping the mobile station ending measurement reports which in particular facilitate locating the mobile station.

This provides various ways of preventing that the silent call is aborted, respectively ensures that the mobile station can be located.

In particular, the measurement reports are sent from the mobile station to a base transceiver station, BTS.

Advantageously and preferably, the first unrealizable SETUP message comprises a call control message that the mobile station cannot carry out.

This ensures that the SETUP message cannot be realized by the mobile station, thereby prolonging the silent call.

In other words, the call control message is a message that the mobile station cannot fulfill.

An inventive method for localizing a mobile station comprises the steps of: activating a mobile station by performing the method above or any of its advantageous implementation forms; localizing the mobile station by using the established MTC communication link.

Advantageously and preferably, activating the mobile station comprises transmitting a call request to the mobile station, wherein the call request is adapted to cause the mobile station to transmit a locator signal whilst blocking an assignment process, wherein the location of the mobile station is determined based on the locator signal.

Advantageously and preferably, the call request prompts the mobile station to transmit channel signals which comprise information for identifying a channel used by the mobile station.

Advantageously and preferably, sending the at least one more unrealizable SETUP message is repeated until the mobile station is localized.

The inventive method for localization comprises the same advantages as the inventive method for GSM silent call prolongation.

An inventive mobile apparatus comprises a network device which is compatible with the communication standard of a network of the mobile station, in particular with the standard of a GSM based network, and which is configured to perform a method according to any one of the methods or their advantageous implementation forms above.

Advantageously and preferably, the mobile apparatus further comprises a backpack which is configured and designed to receive the network device inside the backpack.

The inventive apparatus comprises the same advantages as the inventive method for GSM silent call prolongation.

An inventive vehicle, in particular motor vehicle, comprises a mobile apparatus or any of its advantageous implementation forms as described above.

The inventive vehicle comprises the same advantages as the inventive method for GSM silent call prolongation.

An inventive system comprises a mobile apparatus as described above; and a locating device which is adapted to determine the direction and/or localize the location of a mobile station based on channel signals which are transmitted by the mobile station.

The inventive system comprises the same advantages as the inventive method for GSM silent call prolongation.

An inventive computer program comprises instructions which, when the program is executed by a computer, cause the computer to carry out any one of the methods described above.

The inventive computer program product comprises the same advantages as the inventive method for GSM silent call prolongation.

An exemplary embodiment of the invention is now further explained with respect to the drawings by way of examples only, in which FIG. 1 shows a schematic view of a method according to an embodiment of the present invention;

FIG. 6 shows a schematic view of a system according to an embodiment of the present invention.

Figure 3:
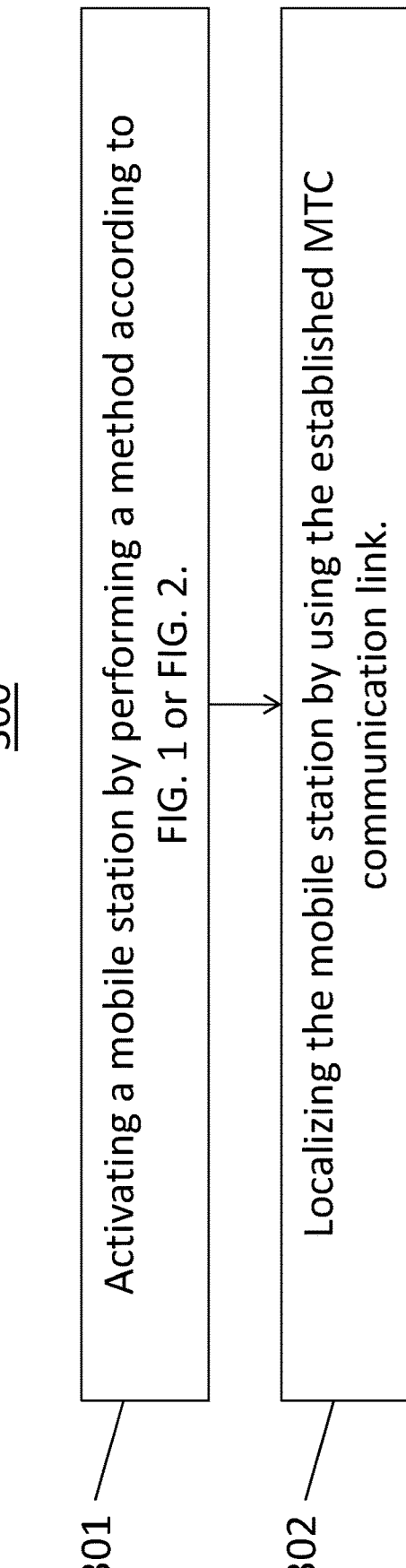
FIG. 3 shows a schematic view of another method according to an embodiment of the present invention.
Figure 4:
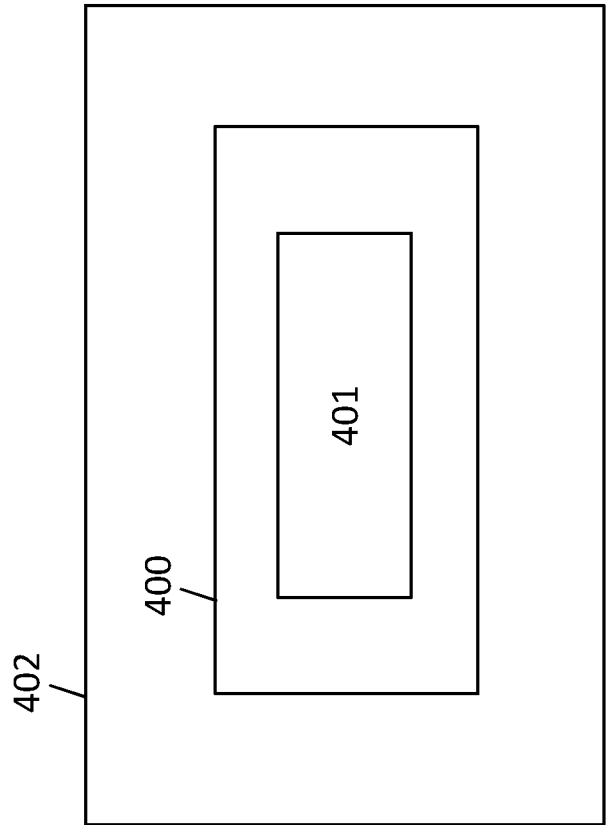
FIG. 4 shows a schematic view of a mobile apparatus according to an embodiment of the present invention.
Figure 5:
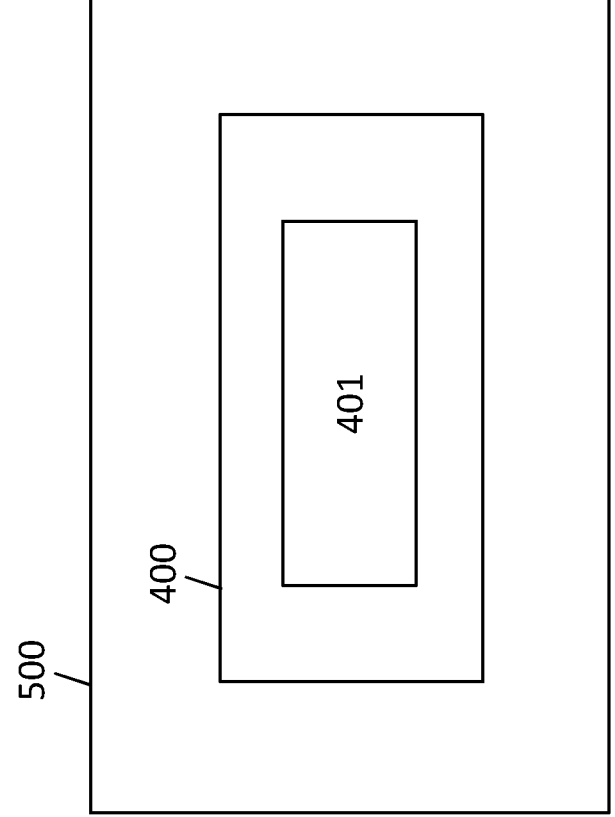
FIG. 5 shows a schematic view of a mobile apparatus according to an embodiment of the present invention.

In the following, the function of an embodiment of the inventive method is described based on FIG. 1. Then, based on FIG. 2, the inventive method is described in more detail, in particular by explaining optional features of the device. In FIG. 3, the function of another embodiment of the inventive method is described. FIGS. 4, 5 and 6 describe the function of an inventive mobile apparatus, vehicle and system implementing the method of any one of FIG. 1, FIG. 2 or FIG. 3.

FIG. 1 schematically shows a method 100 according to an embodiment of the present invention.

Current mobile stations (e.g., mobile phones, mobile terminals, user equipment) terminate active GSM silent calls too early, e.g. already after 7 minutes, before localization of the mobile station can be completed. The method 100 enables prolonging this duration, in particular as long as it is deemed useful in a use case at hand, to successfully complete localization of the mobile station.

The method 100 is for prolongation of a GSM silent call and comprises a first step of activating 101 a mobile station MS by establishing a mobile terminated call (MTC) communication link to the mobile station MS, wherein the establishing of the MTC communication link is performed without sending an assignment command message to the mobile station MS. The GSM silent call is based on an active incomplete terminating call without alerting on B-party side. The MTC is discussed in 3GPP specification TS 24.008 V13.4.0, chapter 5.2.2.

In other words, a network side device (e.g., a BSC or a BTS) starts with an MTC via message PAGING COMMAND and message PAGING RESPONSE. Then, a terminating call can be delayed by entering an Identity Request Loop (alternatively for IMSI or IMEI or TMSI). As long as this loop will be continued by a mobile station MS, direction finding (i.e. localization of the mobile station) is possible. Newer mobile stations MS (e.g. smart phones) interrupt this procedure by sending a RELEASE INDICATION message and thereby abort localization of the mobile station too early.

To prolong the GSM silent call, a call control activity of the mobile station MS can be initiated during the request loop. Call control activity effects the extension of the duration of the request loop.

The call control activity may have a minimum call control impact. Therefore a call control message can be willfully defined as "unrealizable" by the mobile station. The mobile station can respond to this message by sending a "Release Complete" message and an error cause.

To this end, the method 100 further comprises a second step of sending 102 a first unrealizable SETUP message to establish the silent call.

To maintain the request loop and keep up the GSM silent call, the method 100 further comprises a third step of sending 103 at least one more unrealizable SETUP message to prolong the silent call.

For building the unrealizable SETUP message, the SETUP message from TS 24.008 V13.4.0, chapter 9.3.23 can be used. The optional message parameter "Bearer Capability" (BC) can be used for this purpose. The value of the BC element "TransferMode" can be set to "paket_mode(1)". The value of the BC element "InfoTransferCapability" can be set to "reserved (7)". This leads to an unrealizable CC SETUP message, which the mobile station does not understand and responds by a "CC Release Complete" message with an error cause.

Thereby, the GSM silent call can be effectively prolonged.

Optionally, the step of sending the at least one more unrealizable SETUP message is repeated after a predefined amount of time. That is, it is waited for a certain time interval, until the unrealizable SETUP message is sent again.

Further optionally, the step of sending at least one more unrealizable SETUP message is repeated after a predefined number of identity requests is sent. Thereby, sending the unrealizable SETUP message is adapted to the duration of an Identity request loop.

Optionally, the step of sending the at least one more unrealizable SETUP message is repeated until a break condition is met. For example, the at least one more unrealizable SETUP message is sent until the mobile station is localized.

Optionally, the first unrealizable SETUP message is for at least one of: making the mobile station answering with an error message; keeping the mobile station active; keeping the mobile station waiting in a call control level; keeping the mobile station sending measurement reports which in particular facilitate locating the mobile station.

Optionally, the first unrealizable SETUP message comprises a call control message that the mobile station cannot carry out.

Figure 2:
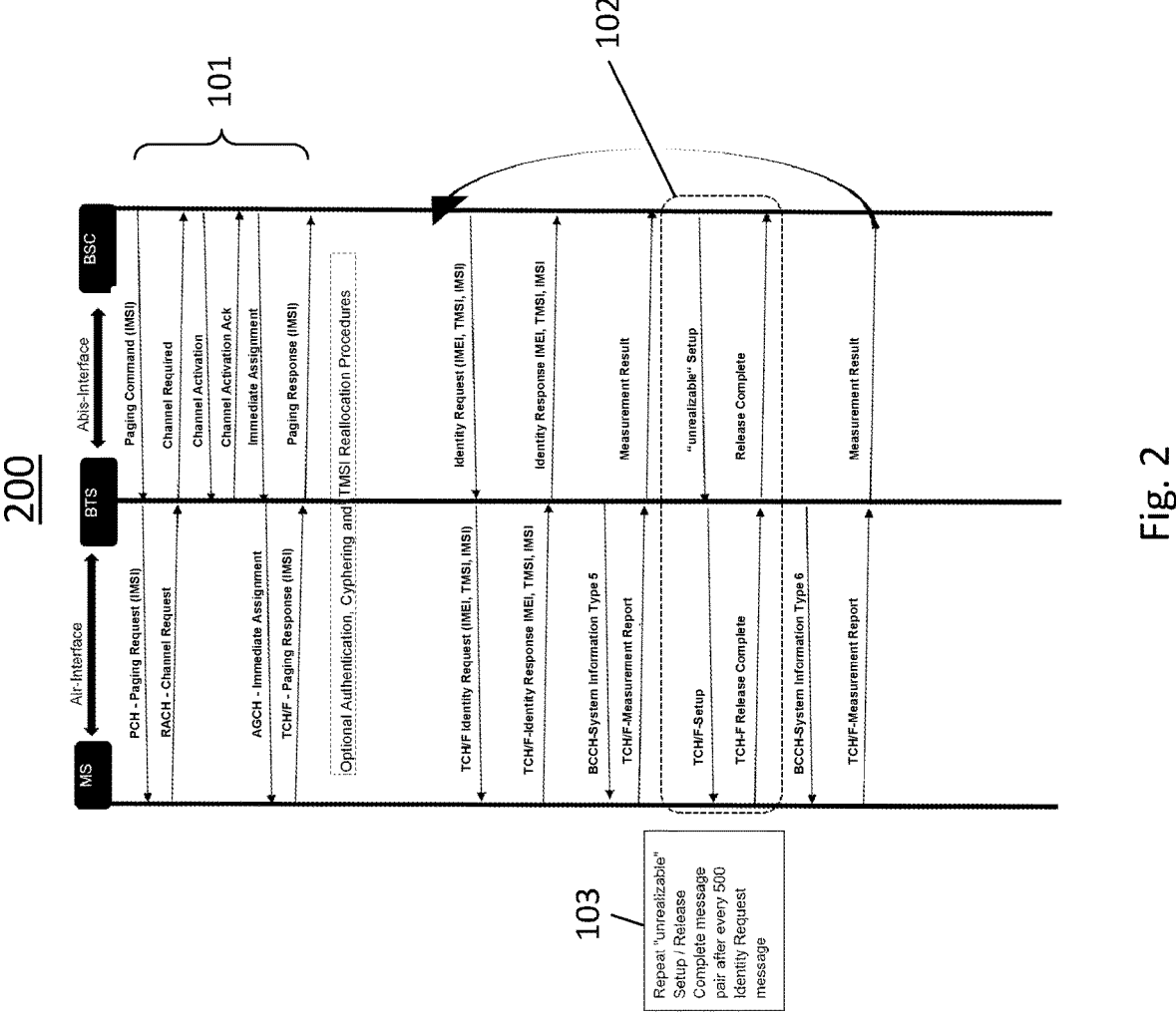
FIG. 2 shows a schematic view of a method according to an embodiment of the present invention in more detail.

FIG. 2 shows a schematic view of a method 100 according to an embodiment of the present disclosure in more detail.

The method 100 shown in FIG. 2 comprises all features and functionality of the method 100 of FIG. 1, as well as the following optional features:

As shown in FIG. 2, the function of the network side can be provided by a BTS and/or a BSC. The network side can start a MTC communication link establishment by sending a paging request message and by receiving a paging response message. Upon sending the paging request message, the mobile station MS can respond by sending a channel request to the network side. After a random access process, the network side sends an immediate assignment signal the mobile station MS.

After this paging and channels assignment procedure, optional authentication, cyphering and TMSI reallocation procedures (partially shown in FIG. 2) may take place.

Additionally, identity request signals to determine IMSI data and/or IMEI data may be sent to the mobile station MS. The mobile station MS responds with corresponding identity responses.

As a next step a call control or call connection procedure can be initiated. For this call control procedure a specific setup procedure is initiated.

To prolong the GSM silent call, the network side (i.e. the BTS or the BSC) sends an unrealizable SETUP message to the mobile station MS. The mobile station can respond to this message by sending a "Release Complete" message and an error cause. Thereby, the mobile station is kept waiting in a call control level and keeps sending measurement reports which in particular facilitate locating the mobile station.

In other words, the mobile station MS will remain in a "wait state". The mobile station MS will periodically send Measurement Report messages 29 to the network side. In this wait state the mobile station MS transmits continuously measurement result messages over the SACCH channel. During the wait state, the mobile station MS may be localized by using the Measurement Report messages as locator signals.

In order to keep the mobile station in this state, at least one more unrealizable SETUP message is sent to the mobile station. This can be done after sending a predefined number of identity request messages (e.g. after at maximum, or at least 500 messages).

FIG. 3 shows a schematic flow chart for illustrating an embodiment of a method 300 for localizing a mobile station according to the present invention.

In a first step 301, a mobile station MS can be activated without user interaction, i.e. without being recognized by the user of the mobile station MS. For this activation step 301, a method can be employed such as the one described with regard to FIG. 1 or FIG. 2.

In a second step 302, the mobile station MS is localized by using the established MTC communication link. Here, a locator signal which is produced and transmitted by the mobile station MS during the first step 301 is used by a specially designed locating device (see FIG. 6).

FIG. 4 shows a block diagram of a mobile apparatus 400 according to the present invention. The mobile apparatus 400 comprises a network device 401 and is configured to perform a method for activating and/or localizing a mobile station MS, as described above with regard to FIGS. 1-3. This network device 401 may be portable and thus mobile. The network device 401 can be similar in construction to a regular network base transceiver station (BTS) and also operates similar to a BTS. The network device 401 can be adapted to emulate a wireless micro-network where the network device 401 operates as the master system of a communication to the mobile stations MS. The emulated wireless micro-network of the network device 401 may be compatible with the communication standard of the mobile station MS.

In the embodiment shown in FIG. 4, the network device 401 can be arranged within a backpack 402. This makes the mobile apparatus 40 portable, as it can be carried by a user.

FIG. 5 shows a block diagram of a vehicle 500 according to according to the present invention. The vehicle 500 can be a motor vehicle, such as a van, car, truck, etc., and comprises a mobile apparatus 400, which is arranged inside the vehicle, e.g. within the passenger compartment of the vehicle 500.

FIG. 6 shows a schematic illustration of a system 600 according to the present invention. The system 600 comprises a mobile apparatus 400 and a locating device 601. This locating device 601 is adapted to localize the direction and/or location of a mobile station MS caught by the mobile apparatus 400. The localization can be executed by the locating device 601 based on channel signals which are transmitted by the mobile station MS. For this purpose, the locating device 601 can comprise a portable directional antenna and a measurement device, such as a spectrum analyzer.

Although the present invention has been described above with reference to preferred embodiments, it is not restricted to said embodiments but can be modified in numerous different ways. In particular, in the foregoing specification the invention has been described with reference to specific examples of embodiments of the invention. It will, however, be evident that various modifications and changes may be made therein without departing from the scope of the invention as set forth in the appended claims.

"Mobile station" is a terminology used in GSM standard and stands for any kind of wireless telecommunication device. A mobile station can be any device used directly by an end-user to communicate. Thus, for instance, mobile stations can be understood to include in addition to conventional hand-held cell phones also smartphones, tablet PCs and laptops equipped with a mobile broadband adapter, for example mobile computers, navigational devices, PDAs (Personal Digital Assistants) and any other device with this communication functionality. The expression "mobile station" used in the present description can be understood to include any devices that have such an integrated mobile communications functionality, irrespective of whether further functionalities are integrated in these devices. For communication purposes, the mobile station is typically connected via the base transceiver station (BTS) to the base station controller (BSC). In UMTS and LTE a "mobile station" roughly corresponds to a user equipment.

It is important to note that the inventive system and method very closely correspond. Therefore, all of the above said regarding the system is also applicable to the method and vice versa. Everything which is described in the description and/or claimed in the claims and/or drawn in the drawings can be combined.

The invention is not limited to the illustrated embodiment. All features described above or features shown in the figures can be combined with each other in any advantageous manner within the scope of the invention.

The invention claimed is:

1. A method for GSM silent call prolongation, the method comprising the steps of:

activating a mobile station (MS) by establishing a mobile terminated call, MTC, communication link to the mobile station (MS), wherein the establishing of the MTC communication link is performed without sending an assignment command message to the mobile station (MS);

sending a first unrealizable SETUP message to establish the silent call; and sending at least one more unrealizable SETUP message to prolong the silent call, wherein the step of sending the at least one more unrealizable SETUP message is repeated after a predefined number of identity requests is sent, and wherein the predefined number comprises at least 500 identity requests.

2. The method according to claim 1, wherein the step of sending the at least one more unrealizable SETUP message is repeated after a predefined amount of time.

3. The method according to claim 1, wherein the step of sending the at least one more unrealizable SETUP message is repeated until a break condition is met.

4. The method according to claim 1, wherein the first unrealizable SETUP message is for at least one of:

keeping the mobile station (MS) answering with an error message;

keeping the mobile station (MS) active;

keeping the mobile station (MS) waiting in a call control level; and keeping the mobile station (MS) sending measurement reports which in particular facilitate locating the mobile station (MS).

5. The method according to claim 1, wherein the first unrealizable SETUP message comprises a call control message that the mobile station (MS) cannot carry out.

6. A method for localizing a mobile station (MS), the method comprising the steps of:

activating a mobile station (MS) by performing the method according to claim 1; and localizing the mobile station (MS) by using the established MTC communication link.

7. The method according to claim 6, wherein activating the mobile station (MS) comprises transmitting a call request to the mobile station (MS), wherein the call request is adapted to cause the mobile station (MS) to transmit a locator signal whilst blocking an assignment process, wherein the location of the mobile station (MS) is determined based on the locator signal.

8. The method according to claim 6, wherein the call request prompts the mobile station (MS) to transmit channel signals which comprise information for identifying a channel used by the mobile station (MS).

9. The method according to claim 6, wherein sending the at least one more unrealizable SETUP message is repeated until the mobile station (MS) is localized.

10. A mobile apparatus, comprising a network device which is compatible with the communication standard of a network of the mobile station (MS), in particular with the standard of a GSM based network, and which is configured to perform a method according to claim 1.

11. The mobile apparatus according to claim 10, further comprising a backpack which is configured and designed to receive the network device inside the backpack.

12. A vehicle, in particular motor vehicle, comprising a mobile apparatus according to claim 10.

13. A system, comprising:

a mobile apparatus according to claim 10; and a locating device which is adapted to determine the direction and/or localize the location of a mobile station (MS) based on channel signals which are transmitted by the mobile station (MS).

14. A non-transitory computer-readable storage medium storing instructions which, when executed by a computer, cause the computer to carry out the method according to claim 1.

* * * * *